United States Patent [19]

Paul et al.

[11] Patent Number: 4,658,898

[45] Date of Patent: * Apr. 21, 1987

[54] OIL RESERVOIR PERMEABILITY CONTROL USING POLYMERIC GELS

[75] Inventors: James M. Paul, DeSoto; Edwin T. Strom, Dallas, both of Tex.

[73] Assignee: Mobil Oil Corporation, New York, N.Y.

[*] Notice: The portion of the term of this patent subsequent to Sep. 23, 2003 has been disclaimed.

[21] Appl. No.: 737,617

[22] Filed: May 24, 1985

[51] Int. Cl.$^4$ .................. E21B 33/138; E21B 43/22
[52] U.S. Cl. ...................... 166/270; 166/246; 166/275; 166/294; 166/295; 166/300; 523/130
[58] Field of Search ............... 166/246, 273, 274, 275, 166/270, 292, 294, 295, 300; 175/72; 252/8.5 LC, 8.55 D, 8.55 R; 523/130

[56] References Cited

U.S. PATENT DOCUMENTS

| | | | |
|---|---|---|---|
| 2,390,770 | 12/1945 | Barton et al. | 166/261 X |
| 3,208,524 | 9/1965 | Horner et al. | 166/294 |
| 3,779,315 | 12/1973 | Boneau | 166/294 X |
| 4,009,755 | 3/1977 | Sandiford | 166/273 X |
| 4,078,607 | 3/1978 | Carter et al. | 166/273 X |
| 4,342,866 | 8/1982 | Kang et al. | 536/119 |
| 4,458,753 | 7/1984 | Philips et al. | 252/8.55 D X |
| 4,552,217 | 11/1985 | Wu et al. | 166/270 |

OTHER PUBLICATIONS

Kelco Developmental Product Announcement MX-6 (8/1981).
Pure and Appl. Chem. 56, No. 7, 879–892, (1984), Sandford et al.

Primary Examiner—George A. Suchfield
Attorney, Agent, or Firm—Alexander J. McKillop; Michael G. Gilman; Van D. Harrison, Jr.

[57] ABSTRACT

The permeability of subterranean oil-bearing formations is selectively reduced by the injection into the formation of the non-xanthan, anionic heteropolysaccharide S-130 produced by fermentation with a microorganism of the Alcaligenes species. The polymer forms shear-thinning, viscous solutions which selectively enter the more highly permeable regions of the formation and form a gel plug in them to reduce their permeability. The polymer forms gels which are stable under a wide range of reservoir conditions including high temperatures.

14 Claims, No Drawings

OIL RESERVOIR PERMEABILITY CONTROL USING POLYMERIC GELS

FIELD OF THE INVENTION

This invention relates to polymers which are useful for the control of permeability in subterranean oil-bearing formations and more particularly, to polymers of this kind which have improved gel strength, gel consistency and injectivity. The invention also relates to the control of permeability in oil reservoirs using these polymers and to production methods using them.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced so as to improve the displacement of the oil from the reservoir. The use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried but vertical communication among reservoir strata often renders such measures ineffectve. Physical plugging of the high permeability zones by cements and solid slurries has also been attempted with varying degrees of success but here, the most serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This led to the use of oil/water emulsions, gels and polymers for controlling the permeability of the formations in a process frequently referred to a "profile control", a reference to the control of the vertical permeability profile of the reservoir. Profile control agents which have been proposed have included oil/water emulsions, gels, e.g. lignosulfonate gels and polymers, with polymers being the most extensively applied in recent years.

Among the polymers so far examined for improving waterflood conformance are polyacrylamides, polysaccharides, celluloses, furfural-alcohol and acrylic/epoxy resins, silicates and polyisocyanurates. A major part of this work has been conducted with the polyacrylamides. Polyacrylamides have been used in their normal, noncrosslinked form as well as in the form of cross-linked metal complexes, as described, for example, in U.S. Pat. Nos. 4,009,755; 4,069,869, and 4,413,680. In either form, the beneficial effects derived from these polyacrylamides seem to dissipate rapidly due to shear degradation during injection and sensitivity to reservoir brines.

Another group of polymeric thickeners which has received considerable attention for use in waterflooding is the polysaccharides, particularly the xanthan polysaccharides, that is, the polysaccharides produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of cross-linked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. The use of polyvalent metal ions for cross-linking polysaccharides and other polymers which are to be used for permeability control is described in U.S. Pat. Nos. 4,009,755, 4,069,869 and 4,413,680.

One problem which has continually attended the use of organic polymers as profile control agents is that of stability in the reservoir. This requires not only that the gel formed by the polymer should be stable to the relatively high temperatures which are encountered in some reservoirs—in itself, a difficult requirement—but also, that the gel should be stable over as wide a range of pH conditions as possible so that the polymer will have the potential of being used in reservoirs of different kinds, e.g. sandstone, carbonate rock and others. Stability to various oilfield brines is another desirable requirement. Many of the known types of organic gel-forming polymers ar unsatisfactory in one respect or another, e.g. temperature, stability, brine stability, pH range, so that there has been a continuing need for new and different polymers for permeability control purposes.

SUMMARY OF THE INVENTION

It has now been found that a non-xanthan polysaccharide, the heteropolysaccharide S-130, has properties which make it highly suitable for use in controlling the permeability of subterranean strata. According to the present invention, there is therefore provided a method of controlling the permeability of a subterranean, oil-bearing formation which comprises injecting into the formation an aqueous polymeric dispersion or solution of heteropolysaccharide S-130.

DETAILED DESCRIPTION

Polymer gels are generally used for permeability profile control in oilfield flooding operations for enhanced oil recovery. In flooding operations, a liquid, usually water is injected into the subterranean, oil-bearing formation through an injection well which extends from the surface of the earth down into the formation. A production well also extends into the formation at an offset or horizontal distance from the injection so that, as the flooding liquid is injected into the formation through the injection well, it displaces the oil towards the production well, from which it may be recovered.

Invariably, more than one injection well and more than one production well will be used in order to cover the oilfield adequately and recovery is maximized; various arrangements of injection and production wells are used to this end, e.g. linear arrangements to form a line drive, five spot, inverted five spot, seven spot, inverted seven spot, all of which are established in conventional practice.

To control the permeability of the subterranean formation, an aqueous solution or dispersion of the polymer is injected into the formation through the injection well. The aqueous fluids formed by the polymer are non-Newtonian in behavior and exhibit shear-thinning characteristics. These rheological characteristics of the fluid enable it to pass preferentially into the zones or strata of relatively higher permeability and, having entered them, to form a gel-like plug when the shear conditions prevailing during the injection process are removed. Because relatively high shear conditions prevail not only in the injection well as the fluid is being pumped down into the formation but also in the regions of the formation immediately surrounding the injection well, the injected fluid remains in a pumpable, fluid condition in these regions. However, as the injected solution or dispersion of the polymer passes into the regions more distant from the well, the gel sets up in the pores of the formation to reduce its permeability. The initial viscosity of the polymer solution or dispersion prevents it entering the less permeable regions of the formation so that the permeability reduction takes place preferentially in the more highly permeable regions, with the result that after the treatment has been completed, a more uniform permeability is obtained.

The permeability control method using the S-130 polysaccharide as the gel-forming polymer is particularly useful with enhanced recovery processes using a fluid drive such as a waterflood. The permeability control treatment may be carried out periodically, when necessary to achieve the desired permeability profile. The method may also be used to effect control of permeability around a production well, for example, by plugging permeable water channels which would otherwise lead to excess water production at the well.

The polymer which is used in the present permeability control process is the non-xanthan heteropolysaccharide S-130. This polysaccharide is produced by the aerobic fermentation of suitable aqueous nutrient media with an organism of the Alcaligenes species, identified as ATCC 31555 (American Type Culture Collection, Accession No. ATCC 31555, (unrestricted permanent deposit made Aug. 27, 1979). The polymer produced by the fermentation of carbohydrate sources of assimilable carbon in the presence of the microorganism is composed principally of carbohydrate, with a small quantity of O-acyl groups. The carbohydrate portion of the polysaccharide contains glucuronic acid and the neutral sugars mannose, glucose and rhamnose in an approximate molar ratio of 1:2:2. The ratio of terminally linked rhamnose to 1,4-linked rhamnose is 1:2, with the glucose being principally 1,3-linked.

Polysaccharide S-130, its characteristic properties, its method of production and the characteristics of the A. spp. microorganism used in the fermentation are described in greater detail in U.S. Pat. No. 4,342,866, to which reference is made for such details. The polysaccharide is available commercially from the Kelco Oil Field Group, division of Merck and Co. Inc.

Polysaccharide S-130 produces high viscosity aqueous solutions which exhibit superior viscosity retention at high temperatures as well as desirable shear-thinning characteristics. Available data indicate that S-130 maintains at least half its room temperature viscosity at a temperature of 300° F. (about 150° C.) and that the viscosity is stable for relatively long periods at high temperatures. The solutions are highly shear thinning of pseudoplastic; viscosity decreases with increasing shear rate and immediately reverts back to a higher viscosity when shear is reduced. This property enables it to be effectively placed in high permeability portions of subterranean formations so that, when the shear is reduced, a highly viscous gel will be formed to block these regions selectively. However, the high degree of shear thinning which this polymer exhibits also indicates that in certain instances, care may have to be taken in placing it in the formation. Because solutions of the polymer become almost water thin at high shear rates, there is a possibility that under these conditions the solution may be capable of entering the less highly permeable regions of the formation where it would plug them when the gel is re-formed. To prevent this happening, it may be desirable to identify the more highly permeable strata and to inject the polymer solution into these regions alone by the use of suitable packers in the injection well.

The stability of the polymer at relatively high temperatures, particularly above 150° or 165° F., is particularly useful in the present application since it enables the polymer to be used in high temperature reservoirs, e.g. those with temperatures up to 200° F. or even higher without risk of excessive degradation induced by the reservoir temperature. Also, the polymer forms gels which although stiff enough to resist pressure from the flooding liquid are not so hard as to present the possibility of damage to the reservoir.

S-130 polysaccharide, if available as a dry powder, may be hydrated by being mixed into water with suitable agitation to prevent the formation of lumps. High shear polymer mixers or eductors or jet hoppers may be used for mixing. If hydration is delayed, increasing the mixing shear, raising the fluid temperature or both may help overcome delays. If lumps tend to form, an initial slurry of the powder in a non-aqueous solvent such as isopropanol or diesoline may be prepared and the slurry poured into water with agitation, to form a lump-free, viscous solution.

A notable characteristic of S-130 polysaccharide is that it develops a high viscosity in saline waters. The viscosity increase is particularly notable in brines which contain divalent cations such as $Ca^{2+}$ and $Mg^{2+}$ although high concentrations (more than 10,000 ppm) of the divalent ions should be avoided under higly alkaline conditions (above pH 11) since the polysaccharide may then become unstable. Otherwise, the polymer is stable at temperatures up to 300° F. (about 150° C.) between pH 5 and 11. It is unstable above pH 13 and, in addition, if certain cationic surfactants are present, insoluble precipitates may be formed under certain conditions. Simple testing should therefore be carried out to determine whether the polymer will perform satisfactorily under the exact conditions contemplated. The polymer also develops highly viscous aqueous solutions in the presence of monovalent cations such as $Na^+$, $K^+$. It may therefore be formulated with many brines and brackish waters including seawater, salines containing, for example, up to 3% KCl, up to 25% of NaCl or up to 20% $CaCl_2$. It may be desirable to prehydrate the polymer in fresh water (distilled water, deionized water or other water essentially free of cations) before mixing with the saline to the desired dilution.

The S-130 polysaccharide may also be cross-linked to form highly viscous solutions by the use of trivalent cations, especially chromium, aluminum and zirconium, although other cations such as iron (III) which are commonly found in oilfield brines will also effect cross-linking. As when highly saline waters containing monovalent and divalent cations are used, it is preferable to prehydrate the polymer using fresh water and then to mix the prehydrated polymer with a solution of the cross-linking cation in order to achieve the desired, highly viscous aqueous solution.

Cross-linking may also be effected by the use of organic compounds which contain at least two positively charged nitrogen atoms, for example, the salts of diamines such as ethylene diamine, propylene diamine, butylene diamine or of cyclic diamines such as piperazine. The use of organic cross-linking agents is described in detail in co-pending application Ser. No. 737,380, filed May 24, 1985, now U.S. Pat. No. 4,613,631, of L. Espenscheid and J. M. Paul, to which reference is made for details of this mode of producing highly viscous polymer gels.

The polymer is stable over a wide range of pH values, generally up to pH 13 although, as mentioned above, the presence of certain cations may set a somewhat lower limit on stability. Because of this, the polymer thickened solutions may be used in a wide variety of reservoir formations including, in particular, alkaline formations such as carbonate, where other polymers may have reduced stability. Stability of the gel appears to be favorable at pH values from about 4 to 8, with neutral pH (7.0–7.5) being preferred where acidic cross-linking agents such as Cr (III) are not used. If Cr (III) or other acidic cross-linking agents are used, somewhat lower pH values of 4 to 5 are preferred for maximum gel stability.

The final aqueous solution of the polymer will generally contain from 100 to 10,000 ppmw of the polymer, although normally 1,000 to 5,000 ppmw will normally be used with 1,000–3,000 being normally preferred for maximum effectiveness. The amount of the solution will normally be from 10 to 100% of the pore volume of the highly permeable regions which are being treated. When a cross-linking agent such as Cr (III) is being used, it will generally be present in an amount from 0.5 to 10 percent (molar) of the polymer. Thus, if the polymer is present in its normally preferred amount of 1,000–3,000 ppmw, the cross-linking agent will normally be used in an amount from 5–300 ppmw although normally at least 10 ppmw will be required and in most cases at least 25 ppmw will be necessary to ensure a fully developed gel structure. Thus, the content of cross-linking agent will generally be in the range of 25–300 ppmw, referred to fresh water. However, since the polymer is capable of developing highly viscous solutions with saline waters, including those with monovalent cations, divalent cations or both, as mentioned above, it may be possible to use less than these amounts of cross-linking agent if such a saline water is used to formulate the solution.

The invention is illustrated by the following Examples:

EXAMPLES 1–24

The anionic polysaccharide biopolymer S-130 in powder form was dispersed at the desired concentration in an oilfield brine by high speed mixing in a blender for about 20 minutes. The composition of the brine is set out in Table 1 below.

TABLE 1

| Brine Composition | | | |
|---|---|---|---|
| Cations | mg/l | Anions | mg/l |
| Sodium | 60,700 | Chlorine | 119,000 |
| Potassium | 156 | Bicarbonate | 0 |
| Magnesium | 1,950 | Carbonate | 0 |
| Calcium | 12,100 | Sulfate | N.D. |
| Barium | 122 | Hydroxide | 0 |
| Iron | 40 | Sum | 119,000 |
| Sum | 75,168 | | |

Total Dissolved Solids: 194,000 mg/l
Specific Gravity at 25° C.: 1.14739
pH: 4.25

Aliquots (100 ml) of dispersed polymer were further treated with cross-linking agent and NaOH as pH control agent (if used) by mixing in a bender cup for about 15 seconds. The mixed samples were immediately placed in closed bottles and placed in an oven at 74° C. (165° F.). The samples were not held under inert atmosphere but all contained about 400 ppm formaldehyde to prevent microbial degradation.

The cross-linking agents used were Cr (III) as $CrCl_3$, piperazine dilydrochloride (PIP-2HCl) and putrescine dihydrochloride (PUT-2HCl; 1,4-butane diamine dihydrochloride), in amounts from 10 to 200 ppm at a polymer concentration of 2,000 ppmw.

The samples were inspected after extended periods of time (1 week and 1 month for Examples 15–24; 2 weeks and 5 weeks for Examples 1–14) for syneresis, i.e. gel separation. The degree of syneresis was estimated visually as the proportion by volume of separated water; the nature of the gel was also evaluated and noted.

The results are shown in Table 2 below.

TABLE 2

| | | Biopolymer Stability at 74° C. | | | |
|---|---|---|---|---|---|
| Ex. | Crosslinker | Crosslinker Conc., ppm | pH | 1-week Syneresis, % | Syneresis, % | Comments |
| 1 | None | 0 | 5.6 | 5 (1) | 10 (2) | Good gel |
| 2 | None | 0 | 7.1 | 1 (1) | 1 (2) | Rigid gel |
| 3 | None | 0 | 7.5 | 1 (1) | 1 (2) | Rigid gel |
| 4 | None | 0 | 8.0 | 1 (1) | 2 (2) | Rigid gel |
| 5 | None | 0 | 9.0 | 15 (1) | 15 (2) | Stiff gel |
| 6 | Cr(III) | 25 | 4.3 | 2 (1) | 2 (2) | Good gel |
| 7 | Cr(III) | 25 | 7.1 | 10 (1) | 10 (2) | Stiff gel |
| 8 | Cr(III) | 25 | 8.0 | 10 (1) | 10 (2) | Stiff gel |
| 9 | Cr(III) | 25 | 8.6 | 15 (1) | 15 (2) | Stiff gel |
| 10 | Cr(III) | 25 | 9.0 | 20 (1) | 20 (2) | Stiff gel |
| 11 | Cr(III) | 50 | 4.0 | 2 (1) | 2 (2) | Good gel |
| 12 | Cr(III) | 50 | 7.0 | 5 (1) | 8 (2) | Stiff gel |

TABLE 2-continued

Biopolymer Stability at 74° C.

| Ex. | Crosslinker | Crosslinker Conc., ppm | pH | 1-week Syneresis, % | Syneresis, % | Comments |
|---|---|---|---|---|---|---|
| 13 | Cr(III) | 50 | 8.1 | 10 (1) | 10 (2) | Stiff gel |
| 14 | Cr(III) | 50 | 9.0 | 10 (1) | 10 (2) | Stiff gel |
| 15 | PIP—2HCl | 10 | 8.0 | 5 | 10 | Stiff gel |
| 16 | PIP—2HCl | 25 | 8.0 | 2 | 2 | Stiff gel |
| 17 | PIP—2HCl | 50 | 8.0 | 2 | 2 | Stiff gel |
| 18 | PIP—2HCl | 100 | 8.0 | 2 | 2 | Stiff gel |
| 19 | PIP—2HCl | 200 | 8.0 | 1 | 1 | Stiff gel |
| 20 | PUT—2HCl | 10 | 8.0 | 2 | 10 | Stiff gel |
| 21 | PUT—2HCl | 25 | 8.0 | 5 | 10 | Rigid gel |
| 22 | PUT—2HCl | 50 | 8.0 | 5 | 10 | Rigid gel |
| 23 | PUT—2HCl | 100 | 8.0 | 5 | 10 | Rigid gel |
| 24 | PUT—2HCl | 200 | 8.0 | 5 | 10 | Rigid gel |

Notes
(1) 2 week syneresis period
(2) 5 week syneresis period

EXAMPLES 25–37

The procedure of Examples 1–24 was used but with a polymer concentration of 3,000 ppmw and with varying pH values and cross-linking agents as noted with the results in Table 3 below. Samples were again held at 74° C. for periods of 2 and 5 weeks.

TABLE 3

Biopolymer Stability at 74° C.

| Ex. | Crosslinker | Crosslinker Conc., ppm | pH | 1-week Syneresis, %, 2 Weeks | Syneresis, %, 5 Weeks | Comments |
|---|---|---|---|---|---|---|
| 25 | None | 0 | 5.1 | 15 | 30 | Good gel |
| 26 | None | 0 | 7.0 | 25 | 25 | Stiff gel |
| 27 | None | 0 | 8.0 | 15 | 20 | Stiff gel |
| 28 | None | 0 | 9.0 | 25 | 25 | Stiff gel |
| 29 | Cr(III) | 25 | 4.8 | 10 | 30 | Good gel |
| 30 | Cr(III) | 25 | 6.1 | 10 | 10 | Stiff gel |
| 31 | Cr(III) | 25 | 7.1 | 15 | 20 | Stiff gel |
| 32 | Cr(III) | 25 | 8.1 | 20 | 20 | Stiff gel |
| 33 | Cr(III) | 25 | 9.0 | 20 | 25 | Stiff gel |
| 34 | Cr(III) | 50 | 4.3 | 20 | 60 | Good gel |
| 35 | Cr(III) | 50 | 6.1 | 20 | 30 | Stiff gel |
| 36 | Cr(III) | 50 | 7.1 | 15 | 15 | Stiff gel |
| 37 | Cr(III) | 50 | 8.0 | 20 | 20 | Stiff gel |

EXAMPLES 38–42

The procedure of Examples 1–24 was again followed but a holding temperature of 93° C. (200° F.) was used with a polymer concentration of 2,000 ppmw. The results are shown in Table 4 below, for syneresis periods of 2 and 5 weeks.

TABLE 4

Biopolymer Stability at 93° C.

| Ex. | Crosslinker | Crosslinker Conc., ppm | pH | 1-week Syneresis, %, 2 Weeks | Syneresis, %, 5 Weeks | Comments |
|---|---|---|---|---|---|---|
| 38 | None | 0 | 4.8 | 1 | 1 | Good gel |
| 39 | None | 0 | 7.2 | 1 | 2 | Good gel |
| 40 | None | 0 | 8.0 | 2 | 2 | Rigid gel |
| 41 | Cr(III) | 25 | 7.0 | 5 | 5 | Stiff gel |
| 42 | Cr(III) | 25 | 8.0 | 5 | 5 | Stiff gel |

EXAMPLES 43–46

The procedure of Examples 1–24 was used again but with a polymer concentration of 4,000 ppmw. The results are shown in Table 5 below, for syneresis periods of 1 month, 2 months and 2½ months.

TABLE 5

Biopolymer Stability at 74° C.

| Ex. | Crosslinker | Crosslinker Conc ppm | pH | Syneresis, %, 1 mo. | Syneresis, %, 2 mos. | Syneresis, %, 2½ mos | Comments |
|---|---|---|---|---|---|---|---|
| 43 | None | 0 | — | — | 2 | 5 | Very stiff |
| 44 | None | 0 | 7.1 | 10 | 10 | 15 | Stiff gel |
| 45 | Cr(III) | 50 | 8.5 | 30 | 30 | 30 | Rigid gel |
| 46 | Cr(III) | 50 | 4.5 | 20 | 20 | 25 | Very stiff |

We claim:

1. In a method for the enhanced recovery of oil by the injection of a flooding fluid into a subterranean oil-bearing formation through an injection well extending from the surface of the earth into the formation, to displace oil from the formation towards a production well at a distance from the injection well, the improvement which comprises selectively reducing the permeability of the more highly permeable regions of the formation by injecting into the formation through the injection well an aqueous solution of the heteropolysaccharide S-130, said aqueous solution containing cations of basic organic compounds, the cations containing at least two positively charged centers.

2. A method according to claim 1 in which the solution contains 1,000 to 3,000 ppmw of the heteropolysaccharide.

3. A method according to claim 1 in which the solution contains monovalent cations.

4. A method according to claim 1 in which the amount of the solution is from 10 to 100% of the pore volume of the more highly permeable regions of the formation which are to be treated.

5. In a method for the enhanced recovery of oil by the injection of a flooding fluid into a subterranean oil-bearing formation through an injection well extending from the surface of the earth into the formation, to displace oil from the formation towards a production well at a distance from the injection well, the improvement which comprises selectively controlling the permeability of the formation by injecting into the formation through the injection well an aqueous solution of the heteropolysaccharide S-130 to selectively reduce the permeability of the more highly permeable regions of the formation, said solution also containing cations of an organic diamine.

6. In a method for the enhanced recovery of oil by the injection of a flooding fluid into a subterranean oil-bearing formation through an injection well extending from the surface of the earth into the formation, to displace oil from the formation towards a production well at a distance from the injection well, the improvement which comprises selectively controlling the permeability of the formation by injecting into the formation through the injection well an aqueous solution of the heteropolysaccharide S-130 to selectively reduce the permeability of the more highly permeable regions of the formation, said solution of the heteropolysaccharide being prepared by hydrating the heteropolysaccharide in fresh water and adding to the hydrated heteropolysaccharide a cross-linking agent for the heteropolysaccharide.

7. A method according to claim 6 in which the cross-linking agent comprises a salt of a trivalent metal.

8. A method according to claim 7 in which the trivalent metal is chromium (III).

9. A method according to claim 8 in which the concentration of the heteropolysaccharide in the final solution is from 1,000 to 3,000 ppmw and the concentration of chromium (III) is from 25 to 100 ppmw as Cr.

10. A method for the selective control of permeability in a subterranean oil bearing formation which comprises injecting into the formation an aqueous viscous solution of the heteropolysaccharide S-130 and cations of basic organic compounds, the cations containing at least two positively charged centers.

11. A method according to claim 10 in which the solution contains 1,000 to 5,000 ppmw of the heteropolysaccharide.

12. A method according to claim 10 in which the solution contains 1,000 to 3,000 ppmw of the heteropolysaccharide.

13. A method according to claim 10 in which the cations are cations of chromium (III).

14. A method for the selective control of permeability in a subterranean oil-bearing formation which comprises injecting into the formation a viscous solution of the heteropolysaccharide S-130, said solution also containing trivalent cations of chromium (III) or an organic diamine.

* * * * *